(12) United States Patent
Jackson et al.

(10) Patent No.: US 7,640,673 B2
(45) Date of Patent: Jan. 5, 2010

(54) CALIBRATION AND OPERATION OF WHEEL ALIGNMENT SYSTEMS

(75) Inventors: David A. Jackson, Point Roberts, WA (US); Stephen L. Glickman, Los Gatos, CA (US)

(73) Assignee: Snap-On Incorporated, Kenosha, WI (US)

( * ) Notice: Subject to any disclaimer, the term of this patent is extended or adjusted under 35 U.S.C. 154(b) by 155 days.

(21) Appl. No.: 11/882,451

(22) Filed: Aug. 1, 2007

(65) Prior Publication Data

US 2009/0031782 A1 Feb. 5, 2009

(51) Int. Cl.
*G01B 11/275* (2006.01)
(52) U.S. Cl. .................. 33/288; 33/203.18; 356/139.09
(58) Field of Classification Search ............... 33/203.18, 33/203.19, 203.2, 288; 356/139.09, 155
See application file for complete search history.

(56) References Cited

U.S. PATENT DOCUMENTS

| | | | |
|---|---|---|---|
| 4,138,825 A | 2/1979 | Pelta | |
| 4,180,915 A | 1/1980 | Lill et al. | |
| 4,389,793 A * | 6/1983 | Butler | 33/336 |
| 4,629,317 A | 12/1986 | January et al. | |
| 4,761,759 A | 8/1988 | Nkagawa | |
| 4,931,964 A | 6/1990 | Titsworth et al. | |
| 5,046,032 A * | 9/1991 | Alusick et al. | 702/94 |
| 5,056,233 A | 10/1991 | Hechel et al. | |
| 5,488,471 A | 1/1996 | McClenahan | |
| 5,531,030 A | 7/1996 | Dale, Jr. | |
| 5,535,522 A | 7/1996 | Jackson | |
| 5,598,358 A * | 1/1997 | Gender et al. | 702/105 |
| 5,636,016 A | 6/1997 | Coetsier et al. | |
| 5,724,743 A | 3/1998 | Jackson | |
| 5,809,658 A | 9/1998 | Jackson et al. | |
| 5,886,781 A | 3/1999 | Muller et al. | |
| 5,943,783 A | 8/1999 | Jackson | |
| 6,148,528 A | 11/2000 | Jackson | |
| 6,237,234 B1 | 5/2001 | Jackson et al. | |

(Continued)

FOREIGN PATENT DOCUMENTS

WO  WO 2004/111569 A1  12/2004

OTHER PUBLICATIONS

International Search Report issued in International Patent Application No. PCT/US2008/71936, mailed Oct. 6, 2008.

*Primary Examiner*—R. Alexander Smith
(74) *Attorney, Agent, or Firm*—McDermott Will & Emery LLP (57) ABSTRACT

A method is provided for calibrating a sensor pod of a wheel alignment system, the sensor pod including a housing rotatably mounted on a spindle, and an image sensor in the housing having a viewing axis oriented in a direction substantially normal to an axis of rotation of the spindle for imaging a target affixed to an object such as a vehicle wheel. An example of the method includes mounting the pod on a fixture via the pod spindle such that the pod spindle is stationary, and positioning a target to allow imaging of the target with the pod image sensor. The pod is rotated such that its image sensor obtains images of the target in at least two rotational positions, and the images of the target at the at least two rotational positions are processed to determine the location of the axis of rotation of the spindle relative to the image sensor.

14 Claims, 8 Drawing Sheets

U.S. PATENT DOCUMENTS

| | | |
|---|---|---|
| 6,313,911 B1 | 11/2001 | Stieff |
| 6,427,346 B1 * | 8/2002 | Stieff et al. .................... 33/203 |
| 6,483,577 B2 | 11/2002 | Stieff |
| 6,498,959 B1 * | 12/2002 | January et al. ................ 700/56 |
| 6,532,062 B2 | 3/2003 | Jackson et al. |
| 6,560,883 B2 | 5/2003 | Jackson et al. |
| 6,574,877 B2 | 6/2003 | Gray et al. |
| 6,661,505 B2 | 12/2003 | Jackson et al. |
| 6,661,751 B2 | 12/2003 | Asakura et al. |
| 6,731,382 B2 | 5/2004 | Jackson et al. |
| 6,823,601 B2 | 11/2004 | Murray |
| 6,839,972 B2 | 1/2005 | Jackson et al. |
| 6,842,238 B2 | 1/2005 | Corghi |
| 6,871,409 B2 | 3/2005 | Robb et al. |
| 6,931,340 B2 | 8/2005 | Jackson et al. |
| 6,959,253 B2 | 10/2005 | Jackson et al. |
| 6,968,282 B1 | 11/2005 | Jackson et al. |
| 7,089,776 B2 | 8/2006 | Dale, Jr. |
| 7,121,011 B2 | 10/2006 | Murray et al. |
| 7,313,869 B1 | 1/2008 | Rogers |
| 2002/0080343 A1 | 6/2002 | Bux et al. |
| 2004/0244463 A1 | 12/2004 | Dale, Jr. |
| 2006/0090356 A1 | 5/2006 | Stieff |
| 2006/0126966 A1 * | 6/2006 | Strege et al. ................ 382/289 |
| 2006/0274302 A1 | 12/2006 | Shylanski et al. |
| 2006/0274303 A1 | 12/2006 | Jackson et al. |
| 2006/0283027 A1 | 12/2006 | Bryan |
| 2008/0086900 A1 | 4/2008 | Rogers |

\* cited by examiner

FRONT OF VEHICLE ⟶

CALIBRATION AND OPERATION OF WHEEL ALIGNMENT SYSTEMS

TECHNICAL FIELD

The present subject matter relates to automotive service systems, such as wheel alignment systems. The present disclosure has particular applicability to wheel alignment systems utilizing a combination of image processing based alignment technologies and one or more other alignment technologies.

BACKGROUND

A current conventional vehicle wheel alignment system uses sensors or heads that are attached to the wheels of a vehicle to measure various angles of the wheels and suspension. These angles are communicated to a host system, where they are used in the calculation of vehicle alignment angles. In the standard conventional aligner configuration, four alignment heads are attached to the wheels of a vehicle. Each sensor head comprises two horizontal or toe measurement sensors and two vertical or camber/pitch sensors. Each sensor head also contains electronics to support overall sensor data acquisition as well as communications with the aligner console, local user input, and local display for status feedback, diagnostics and calibration support. The four sensors and electronics as well as the mechanical housing that makes up each head necessarily is duplicated four times, as there is one for each wheel.

In recent years, wheels of motor vehicles have been aligned in some shops using a computer-aided, three-dimensional (3D) machine vision alignment system. In such a system, one or more cameras view targets attached to the wheels of the vehicle, and a computer in the alignment system analyzes the images of the targets to determine wheel position and alignment of the vehicle wheels from the wheel position data. The computer typically guides an operator to properly adjust the wheels for precise alignment, based on calculations obtained from processing of the image data. A wheel alignment system or aligner of this image processing type is sometimes called a "3D aligner." An example of a vehicle wheel aligner using such image processing is the Visualiner 3D or "V3D", commercially available from John Bean Company of Conway, Ark., a division of Snap-on Incorporated.

Alternatively, a machine vision wheel alignment system may include a pair of passive heads and a pair of active sensing heads. The passive heads are for mounting on a first pair of wheels of a vehicle to be measured, and the active sensing heads are for mounting on a second pair of wheels of the vehicle. Each passive head includes a target, and each active sensing head includes gravity gauges for measuring caster and camber, and an image sensor for producing image data, including an image of a target of one of the passive heads, when the various heads are mounted on the respective wheels of the vehicle. The system also includes a spatial relationship sensor associated with at least one of the active sensing heads, to enable measurement of the spatial relationship between the active sensing heads when the active sensing heads are mounted on wheels of the vehicle. The system further includes a computer for processing the image data relating to observation of the targets, as well as positional data from the spatial relationship sensor, for computation of at least one measurement of the vehicle.

Traditional sensor-on-vehicle wheel alignment systems are simple to calibrate using well-known calibration fixtures comprising a straight bar and an accurate level. 3D machine vision wheel alignment systems are also calibrated using well-known techniques such as described in U.S. Pat. No. 5,809,658 to Jackson et al. Measurement algorithms for both these types of aligners are also well-known.

There exists a need for a methodology for easily and efficiently calibrating an alignment measurement system that uses a combination of 3D machine vision and conventional measurement technologies. There also exists a need for measurement techniques for such alignment systems.

SUMMARY

The teachings herein provide calibration techniques for alignment systems utilizing a combination of 3D machine vision and conventional sensors, which calibration techniques are easily carried out in the field using conventional calibration fixtures. The teachings herein also provide alignment methods for use with such systems.

According to the present disclosure, the foregoing and other advantages are achieved in part by a method for calibrating a sensor pod of a wheel alignment system, the sensor pod comprising a housing rotatably mounted on a spindle, and an image sensor in the housing having a viewing axis oriented in a direction substantially normal to an axis of rotation of the spindle for imaging a target affixed to an object such as a vehicle wheel. The method comprises mounting the pod on a fixture via the pod spindle such that the pod spindle is stationary, and positioning a target to allow imaging of the target with the pod image sensor. The pod is rotated such that its image sensor obtains images of the target in at least two rotational positions, and the images of the target at the at least two rotational positions are processed to determine the location of the axis of rotation of the spindle relative to the image sensor.

In accord with another aspect of the disclosure, a method of aligning the wheels of a motor vehicle comprises attaching a target to each wheel of a first axle of the vehicle, and attaching a sensor pod to each wheel of a second axle of the vehicle, each sensor pod having an image sensor mounted thereon for imaging a corresponding one of the targets. Each wheel of the first axle is rotated while the wheels of the second axle remain stationary such that the image sensors obtain images of their corresponding targets in at least two rotational positions. The images of each target at the at least two rotational positions are processed to determine the orientation of an axis of rotation of each wheel of the first axle.

Additional advantages and other features of the present disclosure will be set forth in part in the description which follows and in part will become apparent to those having ordinary skill in the art upon examination of the following or may be learned from the practice of the invention. The advantages of the disclosure may be realized and obtained as particularly pointed out in the appended claims.

BRIEF DESCRIPTION OF THE DRAWINGS

Reference is made to the attached drawings, wherein elements having the same reference numeral designations represent like elements throughout, and wherein.

DETAILED DESCRIPTION

The present methodology applies to a wheel alignment system which combines aspects of image processing with one or more other types of measurement technologies. Such a hybrid system uses visible targets; e.g., on passive heads, for two wheels of a vehicle under test, and a combination of optical imaging sensors (e.g., cameras) and other alignment sensors in active sensing heads that attach to two other wheels of the vehicle. Such an alignment system is described in copending U.S. patent application Ser. No. 11/487,964, filed Jul. 18, 2006, the entirety of which is hereby incorporated by reference herein.

Figure 1:
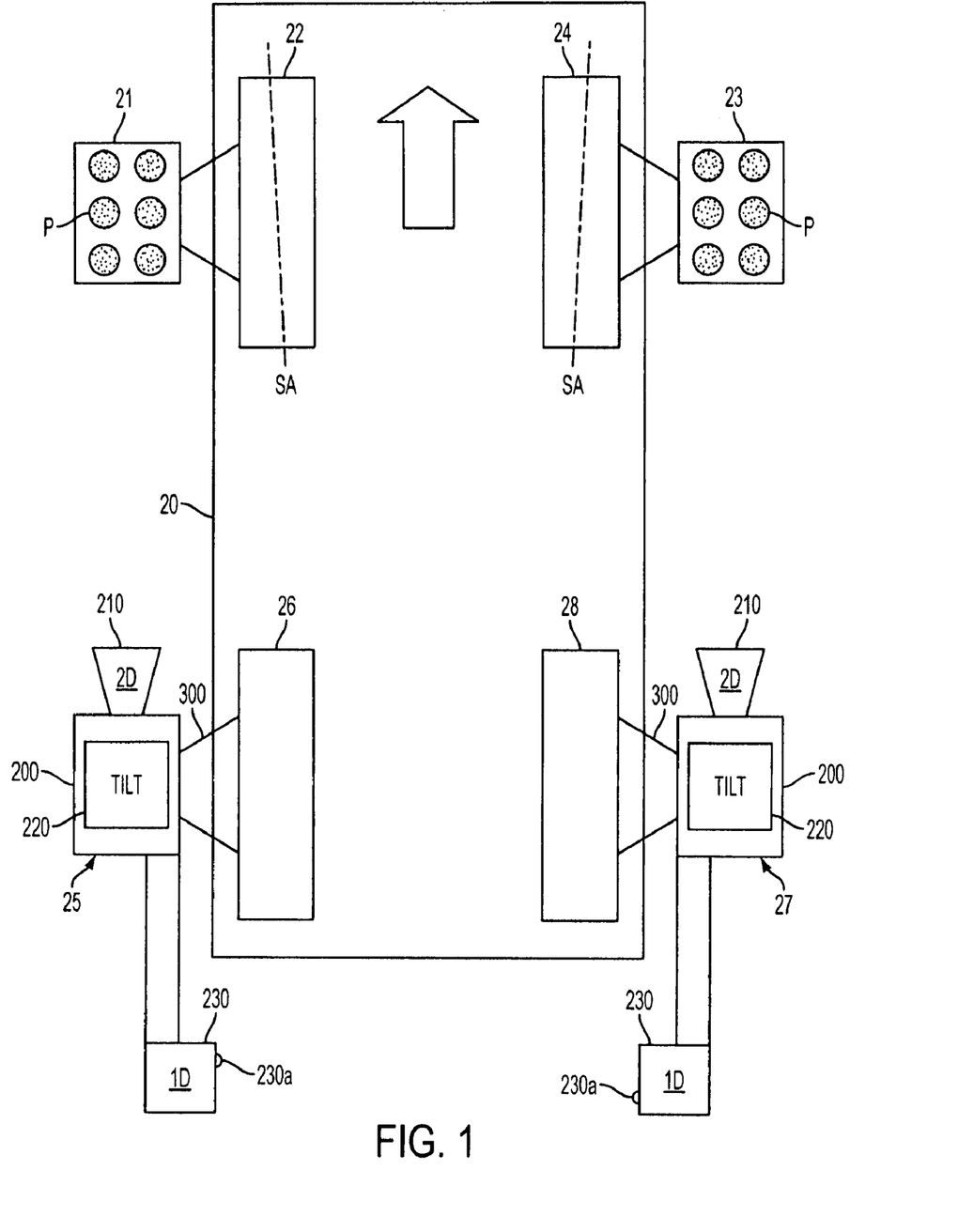
FIG. 1 diagrammatically illustrates an arrangement of targets and active sensing heads in relation to vehicle wheels used in practicing the present methodology.

FIG. 1 depicts an alignment system on which the methods of the present disclosure can be carried out. The system features an arrangement of targets and active sensing heads in relation to wheels 22, 24, 26, 28 of a vehicle 20 that is under test; e.g., to measure one or more wheel alignment parameters. Except for the wheels, elements of the vehicle are omitted for ease of illustration.

The wheel alignment system includes a pair of passive heads 21 and 23, also referred to as "targets" herein, mounted on respective wheels 22 and 24 of the vehicle, which are front steering wheels in this example. Active sensing heads 25 and 27, also referred to as "sensor pods" herein, are adapted for mounting in association with other respective wheels 26 and 28 of the vehicle, in this case the rear wheels. Each active sensing head includes a housing 200 and an image sensor 210 for producing image data, which is expected to include an image of a passive target 21 or 23 when the various heads are mounted to the respective wheels of the vehicle 20. In this first example, the image sensors 210 in the active sensing heads 25 and 27 are two dimensional (2D) imaging devices, e.g. cameras.

The heads 21 and 23 are passive in that they include targets but do not include any sensing elements. Each of the passive heads 21 and 23 includes a target of a type that may be observed by one of the image sensors 210 in the active heads 25 and 27. A target on a passive head 21 or 23, for image sensing by a sensor on another head, may be active or passive. An active target, such as a light emitting diode (LED), is a source driven by power to emit energy (e.g. IR or visible light) that may be detected by a sensor. A passive target is an element that is not driven by power and does not emit energy for detection by a sensor. Assuming an image sensor in head 25 or 27, a passive target would be an object that reflects (or does not reflect) light or other energy in a manner detectable by the respective image sensor. In the example, although the targets could comprise one or more light emitting elements, the targets comprise light and dark regions that can be detected when illuminated by other sources and imaged by cameras or the like in the active sensing heads 25 and 27.

Figure 1A:
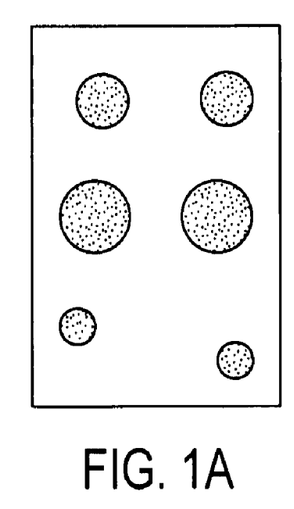
FIGS. 1A and 1B illustrate different types of targets that may be used on passive heads.
Figure 1B:
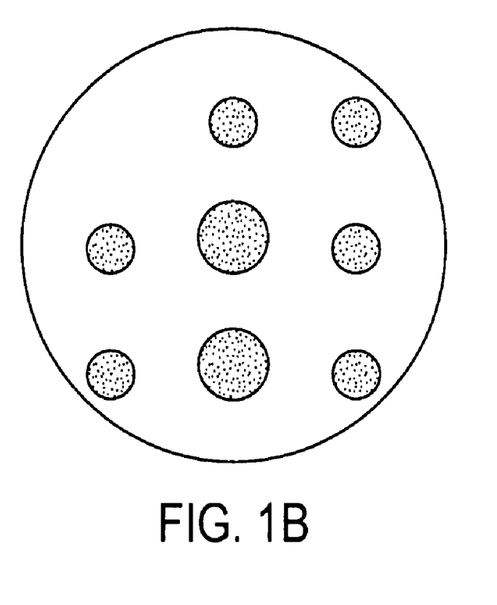

A first example of a target that can be used on either of the passive wheel heads 21 is illustrated in FIG. 1A. In this first example, the target is rectangular. A second example of a target that can be used on either of the passive wheel heads 21 is illustrated in FIG. 1B. In this second example, the target is circular. In each case, the target consists of a flat plate with a pattern of differently sized circles marked on or mounted on the surface of the plate in a pre-determined format and pattern. Although specific patterns are shown FIGS. 1A and 1B, it will be evident that a large number of different patterns can be used on each target. For example, a larger or smaller number of dots may be included and other sizes and shapes can be used for the dots. As another example, multifaceted plates or objects can also be used for the targets. Many examples utilize a number of retro-reflective elements arranged to form each target. For further information, attention is directed to U.S. Pat. No. 5,724,743 to Jackson.

The system also includes a spatial relationship sensor associated with at least one of the active sensing heads 25 or 27. The spatial relationship sensor enables measurement of the spatial relationship between the active sensing heads 25 and 27 when the active sensing heads are mounted on wheels of the vehicle. In general, spatial relationship sensors may measure relative position and/or orientation, depending on the type of sensor used. A positional measurement refers to the relative position of the measured item from the perspective or in the coordinate system of the measuring device. Measurement of position generally uses a standard coordinate system such as Cartesian coordinates or polar coordinates. Orientation may be derived from a three-dimensional position measurement, or orientation may be measured independently of position. Orientation relates to the rotational position of the measured device with respect to the measuring device expressed in a standard coordinate system. Orientation is generally expressed in rotational angles in three orthogonal reference planes.

It will be readily apparent to someone skilled in the art that the wheel alignment systems discussed herein may be implemented with various different types of spatial relationship sensors. In this example, the system uses two conventional one-dimensional (1D) angle sensors 230 to measure the relative angles of the active sensing heads 25 and 27, in the toe plane.

The active heads 25 and 27 also contain conventional gravity sensors or the like to measure tilt, typically camber and pitch, of the head. In this first example, the head 25 includes one or more tilt sensors 220; and the head 27 includes one or more tilt sensors 220.

The system also includes a computer (not shown) in communication with the active sensing heads for processing image data relating to observation of the targets and tilt data, from the active sensing heads. The computer also processes spatial relationship data from the at least one spatial relationship sensor. The data processing enables computation of at least one measurement of the vehicle. The computer is for carrying out the processing steps of the methods described herein electronically.

Measurement using image processing techniques is fundamentally different than using conventional angle measurement technology in a wheel alignment system. Although basic image processing techniques are known to those skilled in the art, a brief description is presented for clarity. The image of a body varies according to the perspective from which such body is viewed and the variation in the image is directly related to and determinable from the perspective angle of the view path along which the body is viewed. Furthermore it is known that it is possible to determine the perspective angles at which an object is viewed merely by relating the perspective image of that object with a true non-perspective image thereof. Conversely put, it is possible to determine the angles at which an object is oriented to a view path (or a plane perpendicular thereto) by comparing a perspective image of an object with a non-perspective image thereof.

In practice, a mathematical representation, or data corresponding to a true image (i.e. an image taken by viewing the target perpendicularly to its primary plane) and the dimensions of the target are preprogrammed into the memory of the computer so that, during the alignment process, the computer has a reference image to which the viewed perspective images of the targets can be compared.

The way that the computer calculates the orientation of the target is to identify certain geometric characteristics on the target, take perspective measurements of these and compare these measurements with the true image previously preprogrammed into the memory of the computer.

Furthermore, since the true dimensions of the target are preprogrammed into the memory of the computer, the method and apparatus of this invention can be used to determine the exact position of the wheels in three-dimensional space. This can be done by firstly determining the perspective image of certain of the elements of the pattern on the target (for example, the distances between circles) and comparing the dimensions of this image to the true dimensions of those elements. This will yield the distance that the element and, accordingly, the target is from the image sensor.

For the wheel alignment system discussed herein, the image sensor in the active head views a target attached to a wheel and produces image data which describes a perspective image of the target. The computer correlates the perspective image data for the target with the true shape of the target. In so doing, the computer relates the dimensions of certain known geometric elements of the target with the dimensions of corresponding elements in the perspective image. Thus, by moving the wheel/target assembly to a plurality of positions, imaging the target at those positions, and then performing certain trigonometric calculations (or by any other suitable mathematical or numerical methods), the computer calculates the alignment of the wheel of the vehicle. The computer can also calculate the three-dimensional orientation of the axis of rotation of the wheel (wheel axis) associated with the passive target.

For additional information regarding measurement based on processing of images of targets, attention again is directed to U.S. Pat. No. 5,724,743 to Jackson, as well as to U.S. Pat. Nos. 5,943,783; 5,535,522; and 6,148,528 to Jackson, and U.S. Pat. No. 5,809,658 to Jackson et al., the entirety of each of which is hereby incorporated by reference herein.

Figure 2:
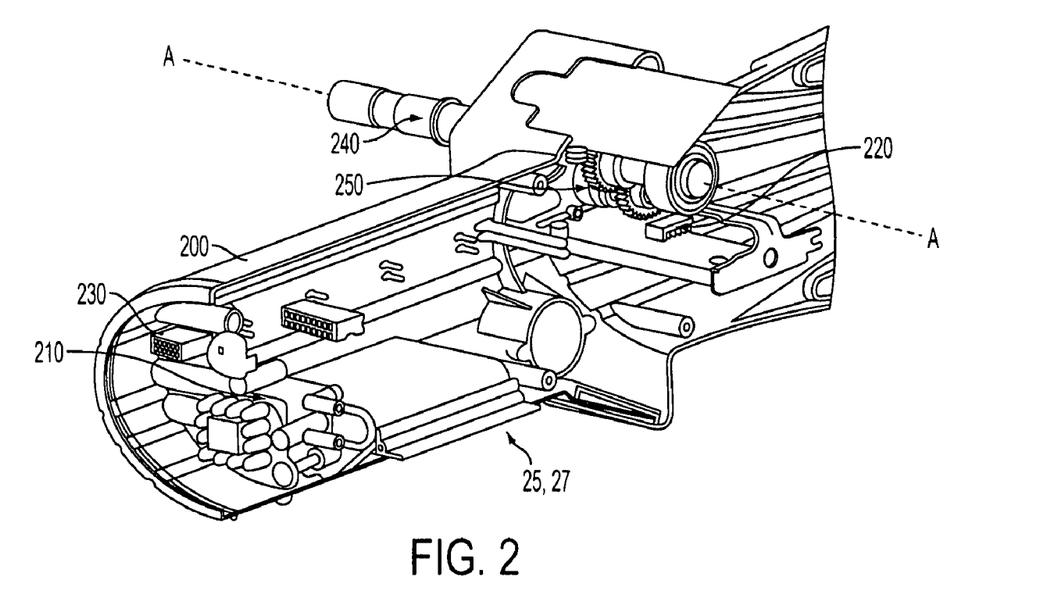
FIG. 2 is a partial cross-sectional perspective view of one the active sensor heads of FIG. 1.
Figure 3A:
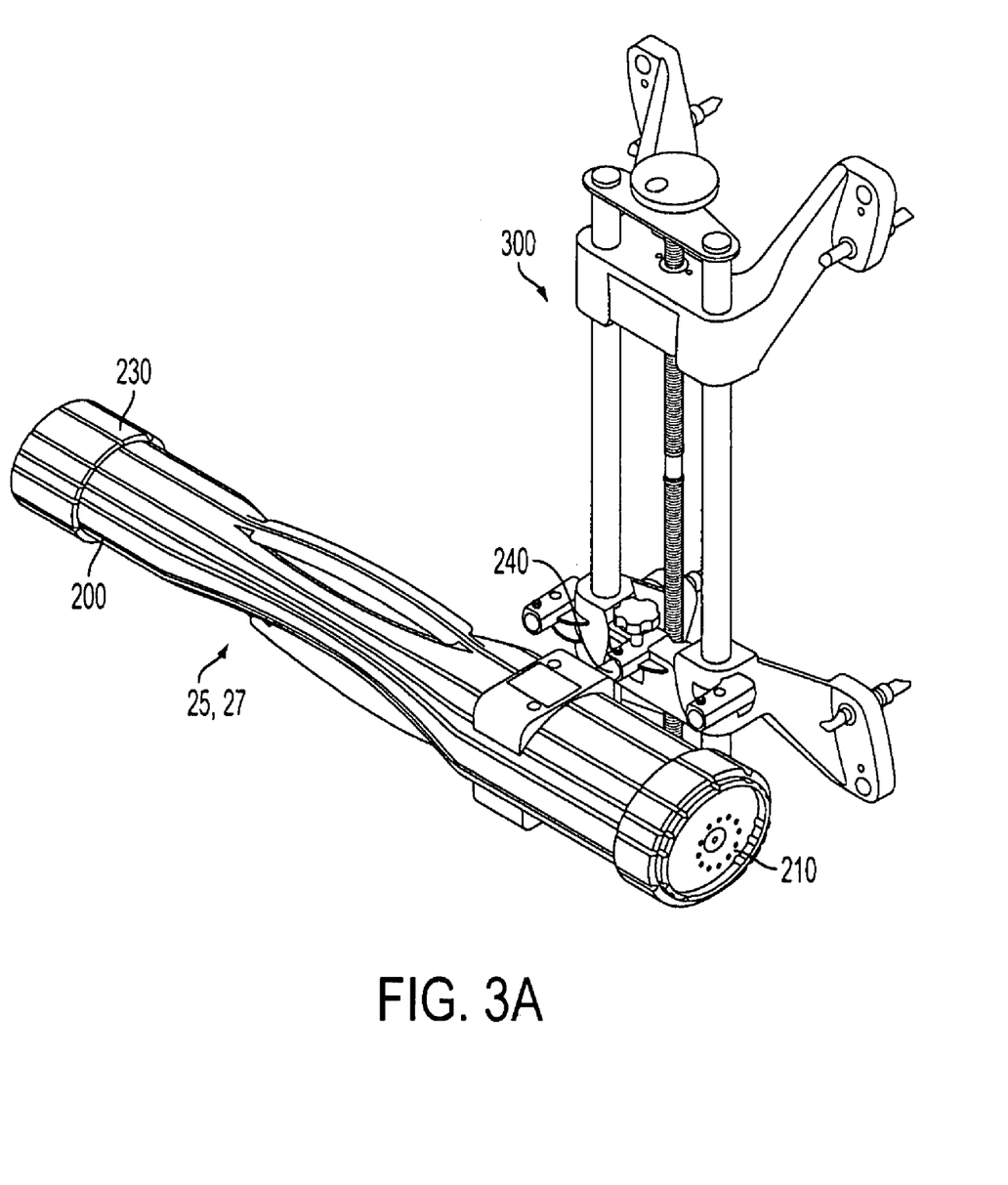
FIG. 3a is a perspective view of one of the active sensor heads of FIG. 1 as attached to a wheel clamp.
Figure 3B:
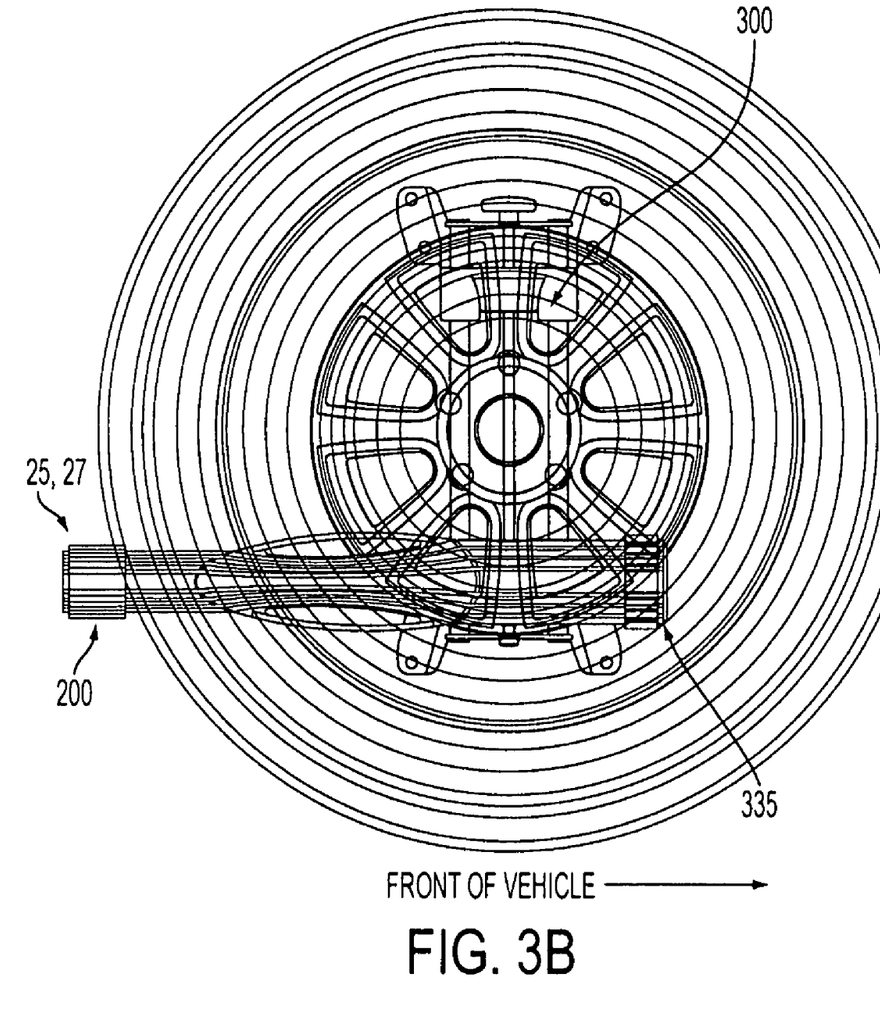
FIG. 3b is a side view of one of the active sensor heads and wheel clamps of FIG. 1 as mounted to a vehicle wheel.

One of the sensor pods 25, 27 of FIG. 1 is shown in greater detail in FIG. 2. The pod includes a housing 200 into which is mounted the two-dimensional camera 210 (e.g., a conventional video camera), the gravity gauge 220 for measuring camber and pitch (i.e., caster), the one-dimensional cross-toe sensor 230, and a cross-toe target (not shown). The pod also includes a spindle 240 to which the housing 200 is rotatably mounted, and a rotational sensor 250. The pod is attached to a wheel clamp assembly 300 shown in FIG. 3a via the spindle shaft 240, so the housing 200 can rotate about the axis of rotation A of the spindle 240 relative to the clamp assembly 300. This rotation is measured by the rotational sensor 250. FIG. 3b shows the sensor pod and clamp assembly 300 attached to a vehicle tire/wheel assembly 335.

In this example, the axis of the spindle 240 is approximately perpendicular to a longitudinal axis of the vehicle when it and the clamp assembly 300 is mounted to the vehicle, and the viewing axis of the camera 210 is mounted in the housing oriented in a direction substantially normal to the spindle's axis of rotation for imaging a target affixed to a wheel on the same side of the vehicle (see FIG. 1). Therefore, the housing 200 rotates about the spindle 240 under the influence of gravity, so that the camera 210 points toward the target if the vehicle wheel 335 to which it is mounted rotates, and can still image the target on the wheel ahead of it.

The cross-toe sensor 230 is oriented along the spindle 240 axis of rotation for sensing the cross-toe target of another sensor pod mounted on a wheel on the opposing side of the vehicle. The conventional cross-toe sensor 230 is a one-dimensional array of sensing elements (e.g., CCDs) with a slit in front of it, which faces across the vehicle to an optical cross-toe target on the other pod, such as an LED. The angle between the two pods is calculated in a conventional manner based on which sensing elements are illuminated by the LED target.

Prior to performing a wheel alignment procedure using the above-described system, a calibration procedure must be carried out to orient the sensors of the sensor pod to each other. An example of such a calibration procedure will now be described in detail.

Figure 4A:
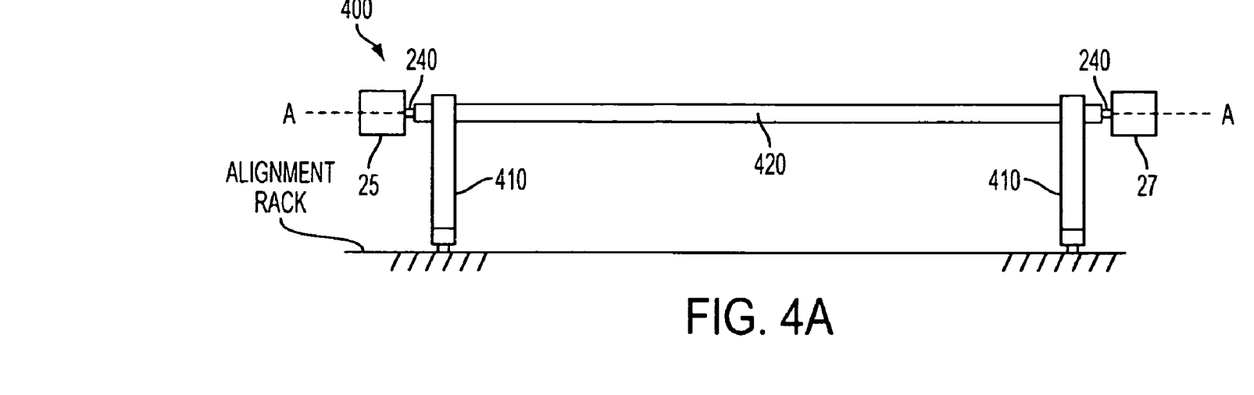
FIGS. 4a and 4b are side and top views, respectively, of a conventional calibration fixture used in practicing the present methodology.
Figure 4B:
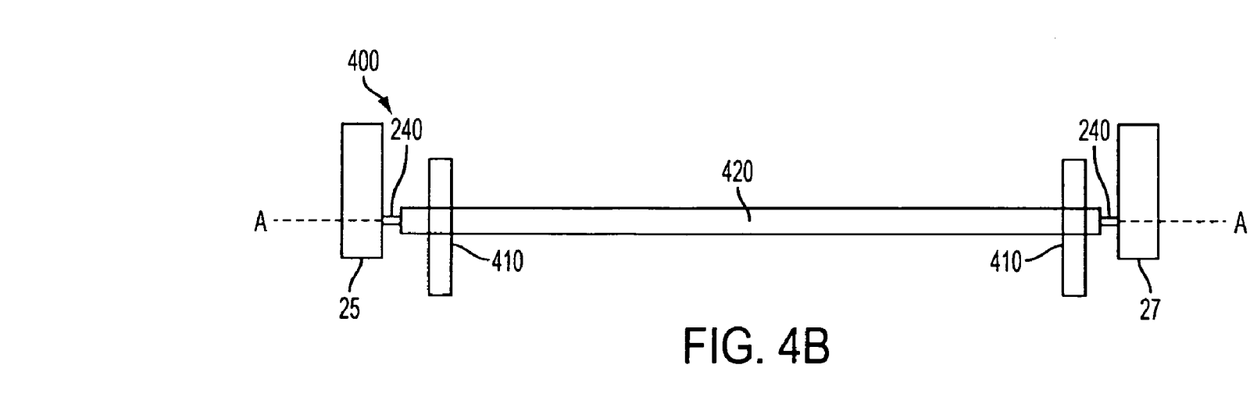
Figure 5:
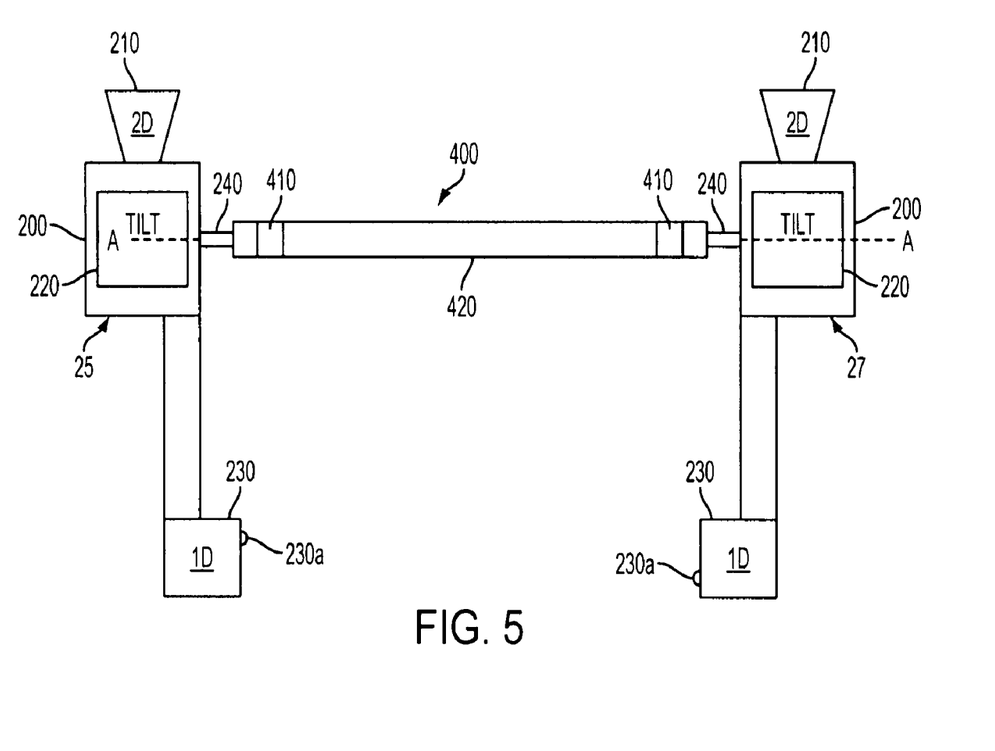
FIG. 5 diagrammatically illustrates an arrangement of targets and active sensing heads mounted on calibration fixtures used in practicing the present methodology.

During calibration, the sensor pods 25, 27 are attached to a fixture known as a "zero bar" 400 as shown in FIGS. 4a and 4b. This calibration fixture 400 can be one used for calibrating sensor pods of conventional non-visual alignment systems. The fixture 400 includes vertical members 410 and a rigid crossbar 420 rotatably mounted to the vertical members 410. The crossbar 420 supports the pods 25, 27 via their spindles 240 such that the spindles 240 are substantially concentric to each other, thus their axes of rotation A are the same. Since the pod housings 200 are rotatably mounted on their spindles 240, the housings 200 are free to rotate about their respective spindles 240 under the influence of gravity, so that when disposed as shown in FIG. 5, their cameras 210 point toward the targets 21, 23 as the crossbar 420 is rotated. The fixture 400 is mounted across a conventional alignment rack (not shown) so the crossbar 420 is substantially parallel to the surface of the rack. The crossbar 420 is considered "perfect" for calibration purposes because it is rigid, and mounted at a known height above the alignment rack.

Referring now to FIG. 5, the targets 21, 23 are placed so each of them is in the field of view of one of the cameras 210. In the illustrated example, targets 21, 23 are mounted to a conventional calibration fixture 500 during the calibration process, and placed on the alignment rack (not shown) such that the targets 21, 23 face the pods 25, 27 and each target 21, 23 can be imaged by the camera 210 of the pod 25, 27 on the same side of the rack.

To begin the calibration procedure, the location of each pod's spindle 240 in its camera 210's coordinate system is determined. This is accomplished by rotating the pod 25, 27 such that its image sensor 210 (i.e., camera) obtains images of its corresponding target 21, 23 in at least two rotational positions; and processing the images of the target at the at least two rotational positions, as by the computer using a well-known axis of rotation calculation formula, to determine the location of the axis of rotation A of the spindle 240 relative to the image sensor 210. After calibration, the spindle axis A is the reference coordinate system for alignment measurements and calculations.

In one exemplary calibration technique, the pods 25, 27 and standard targets 21, 23 are mounted on their respective calibration bars, and each pod is calibrated independent of the other pod. Each pod housing 200 is rotated so its corresponding target is near the top of the camera 210's field of view, the target is imaged, then the housing 200 is rotated so the target is near the bottom of the camera 210's field of view, and the target is imaged again. The images are then processed in a conventional manner by the computer to calculate the axis of rotation A of the spindle.

When employing this technique, the accuracy of the axis of rotation calculation is improved as the angle of rotation of the pod housing 200, and hence the camera 210, increases. A standard target 21, 23, which is typically 2 feet square or less, will only allow an angle of rotation of the camera of about 15 degrees. To increase this angle, in another example a larger target 21, 23, such as an 8-foot long target, is employed to increase the camera angle of rotation to about 45 degrees.

Figure 6:
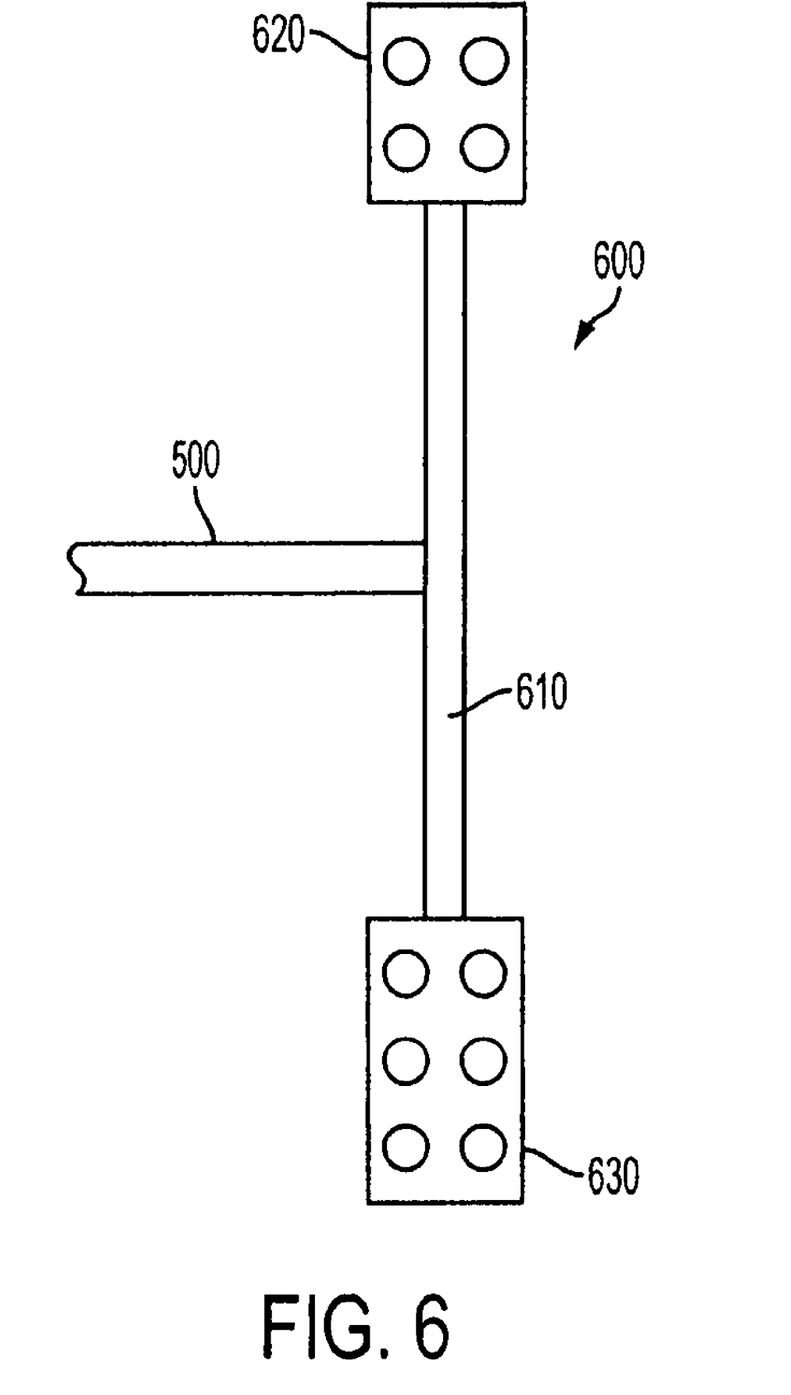
FIG. 6 is a front view of a calibration target used in practicing the present methodology.

The use of a large target is, however, disadvantageous in the field due to its size and cost. Therefore, in a further example, a calibration target 600 as shown in FIG. 6 is mounted on fixture 500 instead of targets 21, 23. Target 600 comprises a straight bar 610 of a desired length with an optical element (target) 620, 630 at each of its two distal ends. The positions of the optical elements 620, 630 relative to each other are known. The calibration target 600 is mounted to one end of the target calibration fixture 500, and the bar is positioned so a pod camera 210 can be rotated to image one target 620, and then rotated to image the other target 630, through a relatively large angle of rotation such as 45 degrees. The at least two images are then processed as in the other discussed examples to calculate the axis of rotation A of the pod spindle 240. This technique is advantageous because it can be used in the field, since the bar 610 and optical elements 620, 630 are relatively small, light, and inexpensive. For example, the optical elements 620, 630 can be 8 inches and 12 inches high, respectively.

The rotational sensor 250 can also be calibrated with the pods and targets mounted to their respective calibration fixtures; for example, at the same time as the location of the spindle 240 is determined. To calibrate the rotational sensor 250, a rotational sensor measurement is obtained at each of the (at least two) rotational positions of the pod 25, 27 where the target 21, 23 is imaged, and a measured angular spindle rotation is determined based on the obtained sensor measurements. The images of the target 21, 23 at the at least two rotational positions are then processed to determine a calculated angular spindle rotation, and the measured angular spindle rotation is compared to the calculated angular spindle rotation. If the measured angle of rotation is different than the calculated angle of rotation, the difference between them is used to calibrate the rotational sensor 250.

After the location of the spindle axis A is determined, the locations of the other sensors in the pod (i.e., the gravity gauges 220 and the cross-toe gauge 230) are determined with respect to the spindle 240. Regarding the gravity gauges 220, they are typically calibrated at the factory with respect to gravity using a conventional technique of mounting them on a known level jig, noting the gauge readings, and subtracting those readings from the gauges' subsequent measurements to get a true reading with respect to gravity.

To calibrate the camber gauge of each pod 25, 27 with respect to the alignment rack, the sensor pods are mounted to a rigid, rotatable calibration bar 420 as shown in FIGS. 4a and 4b, and the calibration fixture 400 is placed across the alignment rack as shown in FIG. 5. Since the fixture 400 is parallel to the alignment rack, the rack will become the zero reference for camber (i.e., left/right tilt), even if the rack is not perfectly level. The camber gauge readings are noted, then the bar 420 is rotated to a plurality of different positions (e.g., four positions) to eliminate the effect of runout of the bar 420, and measurements are taken from the camber gauges 220 at each of the rotational positions. The sensor pods 25, 27 will remain level during this procedure because they are rotatably mounted to the fixture 400. The camber gauge measurements at each of the rotational positions are processed in a conventional manner to obtain a zero camber reference value for each pod 25, 27, respectively.

The cross-toe sensor 230 of each pod can be calibrated at the same time as the camber gauges. Each cross-toe sensor 230 senses the cross-toe target 230a of the opposing sensor pod at each of the rotational positions (e.g., the four positions) of the bar 420. The resulting data relating to the cross-toe targets 230a is then processed in a conventional manner to determine the zero toe reference value of each respective cross-toe sensor 230.

The gravity caster gauge 220, also called a "pitch gauge," is typically calibrated at the factory, using a substantially horizontal (i.e., level) alignment rack. The pods 25, 27 are mounted on the calibration fixture 400 of FIGS. 4a and 4b, the fixture 400 is placed across one end of the level alignment rack so that the pod cameras 210 are facing towards the other end of the alignment rack, and targets 21, 23 are mounted, so they can be imaged by the cameras 210, on conventional turntables 550 instead of fixture 500. The turntables are adjusted in a well-known manner so their axis of rotation is substantially vertical, as by leveling the turntable in two directions. In another example, the targets 21, 23 are rotatably mounted on a vertical spindle instead of a turntable; e.g., a spindle mounted to a vertical fixture.

Next, each target 21, 23 is rotated such that its corresponding pod camera 210 obtains images of the target in at least two rotational positions; e.g., at least 30 degrees apart. The images of each target at the at least two rotational positions are processed in a conventional manner to determine the location of the axis of rotation of each target, respectively. The location of the axis of rotation of each target is then processed using well-known mathematical principles to obtain a zero caster reference value for each pod, respectively. In other words, since each pitch gauge has a particular non-zero value, when the gauge 220 reads that non-zero value, it is known that the actual caster is zero.

In a further example according to the present disclosure, the gravity camber gauges 220 of the sensor pods 25, 27 are calibrated at the same time as the gravity pitch gauges 220; that is, using a level alignment rack. In this example, the location of the axis of rotation of each target 21, 23 mounted on a vertical turntable 550 is processed to obtain a zero camber reference value for each pod 25, 27, respectively. Because the rack is level, this technique determines the camber with respect to gravity, not with respect to the alignment rack (as did the first camber gauge calibration method discussed hereinabove). Thus, field calibration of camber is eliminated in this example; the user of the alignment system is simply instructed to make sure their alignment rack is level, and no further camber calibration will be necessary.

After all the sensors in the pods have been calibrated, the system is ready to perform alignment measurements on a vehicle. As shown in FIG. 1, a target 21, 23 is attached to each wheel 22, 24 of a first axle of the vehicle; i.e., the front wheels of the vehicle, via a wheel clamp such as wheel clamp assembly 300 shown in FIG. 3, and a sensor pod 25, 27 is attached to each wheel 26, 28 of a second axle of the vehicle; i.e., the rear wheels of the vehicle, as by using a clamp assembly 300.

Since the spindles 240 of the sensor pods 25, 27 are typically not parallel to the centers of the vehicle wheels due to the clamp configuration, the orientation of each spindle must be determined relative to the center of the wheel 26, 28 to which it is attached. This is called "runout" and is calculated using a conventional procedure wherein the vehicle is jacked up off its wheels, and each wheel 26, 28 is rotated to three positions, approximately 120 degrees apart. At each position, the change in each pod's camber gauge reading is noted, along with the spindle rotational sensor 250 reading. A well-known mathematical algorithm is then used to calculate the runout at each wheel 26, 28. The output of the runout procedure is a sine curve whose magnitude is the angle between the wheel spindle and the pod spindle 240, and whose origin is represented by an angular value (i.e., where the curve starts on the rotation of the wheel). Thus, a correction factor can be applied to camber and toe readings based on the rotational sensor reading at any given wheel/clamp assembly location.

A runout procedure is also conducted on the front wheels 22, 24 where the targets 21, 23 are mounted. The vehicle is jacked up off its tires, and the rear wheels 26, 28 (on which the sensor pods are mounted) are kept stationary. Each front wheel 22, 24 is rotated such that the camera 210 of each sensor pod 25, 27 obtains images of their corresponding targets 21, 23 in at least two rotational positions. The images of each target 21, 23 at the plurality of rotation positions are then processed to determine the location of the axis of rotation of each front wheel 22, 24. In this case, the location of the wheel with respect to the target can be determined because the target is rigidly mounted to the wheel.

The wheels of the vehicle are thereafter placed on the alignment rack, and alignment measurements taken. Rear wheel camber is calculated in a conventional manner by starting with the camber gauge 220 reading, correcting for runout (i.e., the difference in location between the wheel spindle and the pod spindle 240), and correcting for the difference between the camber gauge reading and gravity previously determined in the above-described calibration procedure.

Individual rear wheel toe is determined using total toe obtained by the cross-toe sensors 230 of the pods, and the geometric center line of the vehicle. Total toe is determined in a conventional manner by sensing the cross-toe targets 230a with the cross-toe sensors 230. The geometric center line is determined by locating each of the targets 21, 23 in space, assigning a point P in space relative to each target 21, 23, and calculating the vector from each rear pod 25, 27 to its corresponding point P. More particularly, each target is imaged with their corresponding pod camera to determine their position in space, then a point P relative to the target is assigned with respect to a known point on the wheel clamp 300. This is called the "claw point." A vector is then calculated between each pod 25, 27 and the corresponding claw point P. The individual toe measurement for each rear wheel is calculated based on the vector for each wheel's corresponding side of the vehicle and the total toe.

Camber and toe of the front wheels are determined by calculating the position and orientation of each front wheel spindle with respect to their corresponding pod camera 210, as by performing the front wheel runout procedure discussed hereinabove. Rotation of the front wheel spindle about a vertical axis indicates the toe of the wheel, and the tilt of the wheel spindle with respect to a horizontal plane indicates the camber of the wheel.

Caster of the front wheels is determined using a similar technique, by determining the position of the steering axis SA of each front wheel 22, 24 with respect to its corresponding sensor pod 25, 27. In this methodology according the present disclosure, the front wheels 22, 24 are steered while they are prevented from turning on their axle (i.e., their spindles), as by applying the vehicle's brakes, while the rear wheels 26, 28 carrying the sensor pods 25, 27 remain stationary. The cameras 210 of the sensor pods 25, 27 obtain images of their corresponding target 21, 23 in at least two steered positions. The images of each target at the at least two steered positions are then processed to determine the location of the steering axis SA of each wheel 22, 24 using well-known mathematical equations. Caster (i.e., the fore/aft tilt of the steering axis compared to a vertical plane) for each wheel can then be easily derived in a known manner. In addition to caster, the same images of each target 21, 23 at the at least two steered positions can also be processed to determine steering axis inclination (SAI), which is the in/out tilt of the steering axis SA compared to a vertical plane.

Referring again to FIG. 1, in another example of the present methodology, a "two-wheel alignment" is carried out on only one pair of opposing wheels of one axle of a vehicle, such as the front wheels 22, 24. This provides a less expensive alignment for the vehicle owner, since it takes less time to perform. In this example, a target 21, 23 is attached to each of the pair of wheels 22, 24 to be aligned, and instead of attaching the sensor pods 25, 27 to the rear wheels 26, 28 via wheel clamps 300 as shown, the sensor pods are positioned (not necessarily mounted via their spindles 240) on the alignment rack to allow imaging of one of the targets 21, 23 with each pod image sensor (camera 210), and to allow sensing of the cross-toe target 230a of each pod by the cross-toe sensor 230 of the other pod.

Each wheel 22, 24 to be aligned is then rotated, as by pushing the vehicle on the rack, such that the cameras 210 obtain images of their corresponding targets 21, 23 in at least two rotational positions while the pods 25, 27 remain stationary. The images of each target 21, 23 at the at least two rotational positions are processed to determine an image-derived toe of each wheel to be aligned. Cross-toe is determined in a conventional manner by sensing of the cross-toe targets 230a using the cross-toe sensors 230 as explained hereinabove. The total toe of the wheels 22, 24 to be aligned is then calculated based on the image-derived toe of each wheel and the cross-toe of the pods; e.g., by adding the image-derived toe of each wheel to the cross-toe value. Note that the individual toe of each wheel 22, 24 cannot be calculated in this example.

To determine the camber of each wheel 22, 24, the images of each target 21, 23 at the at least two rotational positions are processed to determine an image-derived camber of each wheel 22, 24 relative to its corresponding camera 210. A measurement of each camber gauge 220 is also obtained. The camber of each of the wheels 22, 24 is then calculated based on the image-derived camber of each wheel and the corresponding pod's camber gauge measurement; for example, the difference of the image-derived camber of wheel 24 and the reading of the camber gauge 220 of sensor pod 27 is the true camber of wheel 24.

Caster of the front wheels is determined using a similar technique, by determining the position of the steering axis SA of each front wheel 22, 24 with respect to its corresponding sensor pod 25, 27. In this methodology according the present disclosure, the front wheels 22, 24 are steered while they are prevented from turning on their axle (i.e., their spindles), as by applying the vehicle's brakes, while the sensor pods 25, 27 remain stationary. The cameras 210 of the sensor pods 25, 27 obtain images of their corresponding target 21, 23 in at least two steered positions. The images of each target at the at least two steered positions are then processed to determine the location of the steering axis SA of each wheel 22, 24 using well-known mathematical equations. Caster (i.e., the fore/aft tilt of the steering axis compared to a vertical plane) for each wheel can then be easily derived in a known manner.

In addition to caster, the same images of each target 21, 23 at the at least two steered positions can also be processed to determine SAI. The same images can be processed, along with a measurement of the vehicle wheel diameter (determined in a known manner based on the images of the targets in the at least two rotational positions), to determine "caster trail", which is the fore/aft distance between the center of the vehicle's tire where it contacts the alignment rack (i.e., the ground) and the point where the steering axis SA intersects the alignment rack. A related measurement that can be determined at the same time is called "scrub radius", and is the in/out distance (i.e., a distance transverse the longitudinal axis of the vehicle) between the center of the vehicle's tire where it contacts the alignment rack and the point where the steering axis SA intersects the alignment rack. The above-mentioned determinations of vehicle wheel dimensions, scrub radius, etc. are described in detail in U.S. Pat. Nos. 6,532,062; 6,661,505; and 6,237,234 to Jackson, the entirety of each of which is hereby incorporated by reference herein.

The ability to determine caster trail is advantageous because it can be used to diagnose and solve problems of "pull" of the vehicle that cannot be easily diagnosed using caster readings alone. For example, caster on both front wheels of a vehicle may be equal, and the vehicle will nevertheless pull. If caster trail is measured and found to be out of specification on one side, caster on that wheel can be adjusted to correct the caster trail and eliminate the pull.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for calibrating a sensor pod of a wheel alignment system, the sensor pod comprising a housing rotatably mounted on a spindle, and an image sensor in the housing having a viewing axis oriented in a direction substantially normal to an axis of rotation of the spindle for imaging a target affixed to an object such as a vehicle wheel, the method comprising:
   mounting the pod on a fixture via the pod spindle such that the pod spindle is stationary;
   positioning a target to allow imaging of the target with the pod image sensor;
   rotating the pod such that its image sensor obtains images of the target in at least two rotational positions; and
   processing the images of the target at the at least two rotational positions to determine the location of the axis of rotation of the spindle relative to the image sensor.

2. The method of claim 1, comprising providing the target having a bar with an optical element at each of two distal ends; wherein determining the location of the spindle axis of rotation of the pod relative to the image sensor comprises rotating the pod such that the image sensor obtains at least one image of each of the optical elements.

3. The method of claim 1, wherein the pod further comprises a gravity-type camber gauge, and the fixture comprises a rotatable bar, the method comprising:
   mounting the pod on the rotatable bar of the fixture via the pod spindle;
   placing the fixture such that the fixture is substantially parallel to a surface of a reference plane;
   rotating the bar to a plurality of rotational positions;
   obtaining a measurement of the camber gauge at each of the plurality of rotational positions of the bar; and
   processing the camber gauge measurements to obtain a zero camber reference value for the pod.

4. The method of claim 1, comprising:
   providing a pair of the sensor pods, each of the sensor pods comprising a cross-toe sensor and a cross-toe target in the housing, the cross-toe sensor oriented in a direction along the spindle axis of rotation for sensing the cross-toe target of the other sensor pod;
   mounting the pods on a rotatable bar of the fixture via the pod spindles such that the pod spindles are substantially concentric to each other;
   rotating the bar of the fixture to obtain data relating to the cross-toe targets in a plurality of rotational positions; and
   processing the data relating to the cross-toe targets to determine a zero toe reference value for each of the cross-toe sensors.

5. The method of claim 1, wherein the pod further comprises a gravity-type pitch gauge, the method comprising:
   positioning the fixture on a substantially level surface;
   positioning the target such that it is rotatable about a substantially vertical axis;
   rotating the target such that the pod image sensor obtains images of the target in at least two rotational positions;
   processing the images of the target at the at least two rotational positions to determine the location of the axis of rotation of the target; and
   processing the location of the axis of rotation of the target to obtain a zero caster reference value for the pod.

6. The method of claim 5, wherein the pod further comprises a gravity-type camber gauge, the method comprising processing the location of the axis of rotation of the target to obtain a zero camber reference value for the pod.

7. The method of claim 1, wherein the pod comprises a rotational sensor on its spindle for measuring an angular amount of spindle rotation, the method comprising:
   obtaining a rotational sensor measurement at each of the at least two rotational positions of the pod;
   determining a measured angular spindle rotation based on the obtained rotational sensor measurements;
   processing the images of the target at the at least two rotational positions to determine a calculated angular spindle rotation; and
   comparing the measured angular spindle rotation and the calculated angular spindle rotation to calibrate the rotational sensor.

8. A method of aligning the wheels of a motor vehicle, the method comprising:
   attaching a target to each wheel of a first axle of the vehicle;
   attaching a sensor pod to each wheel of a second axle of the vehicle, each sensor pod having an image sensor mounted thereon for imaging a corresponding one of the targets;
   rotating each wheel of the first axle while the wheels of the second axle remain stationary such that the image sensors obtain images of their corresponding targets in at least two rotational positions; and processing the images of each target at the at least two rotational positions to determine the orientation of an axis of rotation of each wheel of the first axle.

9. The method of claim 8, wherein each sensor pod has a housing rotatably mounted on a spindle, and a cross-toe sensor in the housing oriented in a direction along the spindle axis of rotation for sensing a cross-toe target of the other sensor pod, wherein the image sensor has a viewing axis oriented in a direction substantially normal to the spindle axis of rotation for imaging its corresponding target, the method further comprising:

imaging each of the targets with their corresponding image sensors in a single position;

calculating a vector between each of the image sensors and a corresponding point in space relative to their corresponding target;

obtaining data related to the cross-toe targets using the cross-toe sensors;

calculating a total toe of the wheels of the second axle based on the data related to the cross-toe targets; and calculating an individual toe measurement for each wheel on the second axle based on the vector and the cross-toe data.

10. The method of claim 8, comprising calculating at least one of the toe and the camber of each wheel of the first axle based on the location of the axis of rotation of each wheel of the first axle.

11. The method of claim 8, wherein the wheels of the first axle are steerable, the method comprising:

steering the wheels of the first axle while the wheels of the first axle are prevented from turning about the axle, and the wheels of the second axle remain stationary, such that the image sensors obtain images of their corresponding targets in at least two steered positions; and processing the images of each target at the at least two steered positions to determine at least one of a caster and steering axis inclination of each wheel of the first axle.

12. A method of aligning a pair of opposing wheels of one axle of a motor vehicle, the method comprising:

providing a pair of sensor pods, each sensor pod having an image sensor for imaging a target affixed to an object such as a vehicle wheel, and a cross-toe sensor for sensing a cross-toe target of the other sensor pod;

attaching a target to each of the pair of wheels to be aligned;

positioning the sensor pods to allow imaging of one of the targets with each pod image sensor, and to allow sensing of the cross-toe target of each pod by the cross-toe sensor of the other pod;

rotating each wheel to be aligned such that the image sensors obtain images of their corresponding targets in at least two rotational positions;

obtaining data related to the cross-toe targets using the cross-toe sensors;

processing the images of each target at the at least two rotational positions to determine an image-derived toe of each wheel to be aligned;

processing the data related to the cross-toe targets to determine the cross-toe of the pods; and calculating the toe of the wheels to be aligned based on the image-derived toe of each wheel and the cross-toe of the pods.

13. The method of claim 12, wherein each of the sensor pods comprises a gravity camber gauge, the method comprising:

processing the images of each target at the at least two rotational positions to determine an image-derived camber of each wheel to be aligned relative to their corresponding image sensor;

obtaining a measurement of each camber gauge; and calculating the camber of each of the wheels to be aligned based on the image-derived camber of each wheel and the corresponding pod's camber gauge measurement.

14. The method of claim 12, wherein the wheels to be aligned are steerable, the method comprising:

steering the wheels to be aligned while they are prevented from turning, such that the image sensors obtain images of their corresponding targets in at least two steered positions; and processing the images of each target at the at least two steered positions to determine at least one of a caster, caster trail, scrub radius and steering axis inclination of each wheel to be aligned.

* * * * *